(12) United States Patent
Amini et al.

(10) Patent No.: US 9,763,117 B2
(45) Date of Patent: Sep. 12, 2017

(54) MULTI-BAND WIRELESS STATION HAVING MULTIPLE RADIOS IN ONE BAND

(71) Applicant: Netgear, Inc., San Jose, CA (US)

(72) Inventors: Peiman Amini, Mountain View, CA (US); Joseph Amalan Arul Emmanuel, Cupertino, CA (US); ShunLiang Yu, Milpitas, CA (US)

(73) Assignee: NETGEAR, INC., San Jose, CA (US)

( * ) Notice: Subject to any disclaimer, the term of this patent is extended or adjusted under 35 U.S.C. 154(b) by 301 days.

(21) Appl. No.: 14/555,511

(22) Filed: Nov. 26, 2014

(65) Prior Publication Data

US 2015/0271829 A1    Sep. 24, 2015

Related U.S. Application Data

(60) Provisional application No. 61/969,814, filed on Mar. 24, 2014.

(51) Int. Cl.
*H04W 24/02* (2009.01)
*H04W 72/04* (2009.01)
*H04W 8/22* (2009.01)

(52) U.S. Cl.
CPC .............. *H04W 24/02* (2013.01); *H04W 8/22* (2013.01); *H04W 72/0453* (2013.01)

(58) Field of Classification Search
CPC ..... G01S 5/0027; H04L 5/0048; Y02B 60/50; H04W 4/02; H04W 8/183; H04W 36/06; H04W 48/08; H04W 48/12; H04W 48/16; H04W 48/18; H04W 48/20; H04W 52/0229; H04W 64/00; H04W 76/00; H04W 72/044; H04W 72/0453; H04W 76/02; H04W 76/064; H04W 84/00; H04W 88/04; H04W 88/06; H04W 88/08; H04W 88/10

See application file for complete search history.

(56) References Cited

U.S. PATENT DOCUMENTS

| | | | |
|---|---|---|---|
| 2004/0196812 A1* | 10/2004 | Barber .................. | H04W 88/08 370/334 |
| 2006/0073827 A1* | 4/2006 | Vaisanen ........... | H04W 36/0055 455/436 |
| 2013/0051328 A1* | 2/2013 | Chandra ............... | H04W 88/06 370/328 |

* cited by examiner

*Primary Examiner* — Marsha D. Banks Harold
*Assistant Examiner* — Dharmesh Patel
(74) *Attorney, Agent, or Firm* — Michael A. Glenn; Perkins Coie LLP

(57) ABSTRACT

The disclosure is related to a multi-band wireless station, e.g., a wireless access point, that includes more than one wireless radio in the same frequency band. The wireless station operates at multiple frequency bands, e.g., 2.4 GHz and 5 GHz. Further, the wireless station includes multiple radios in the same frequency band. For example, the wireless station can have two radios for the 5 GHz band—one for a low 5 GHz band and another for high 5 GHz band. If the client station is connecting to the 5 GHz band, it can either connect to the first sub-band or the second sub-band of the 5 GHz. The wireless station can decide the sub-band to which a particular client station has to be assigned based on a number of assignment attributes, e.g., client station attributes and the sub-band attributes.

29 Claims, 12 Drawing Sheets

MULTI-BAND WIRELESS STATION HAVING MULTIPLE RADIOS IN ONE BAND

CROSS-REFERENCE TO RELATED APPLICATION(S)

This application claims the benefit of U.S. Provisional Patent Application No. 61/969,814, entitled "METHOD AND APPARATUS FOR WIRELESS LAN LOAD BALANCING, CHANNEL SELECTION, AND POWER ADJUSTMENT WHEN TWO OR MORE RADIOS EXIST IN ONE BAND" filed on Mar. 24, 2014, which is incorporated by reference herein in its entirety

TECHNICAL FIELD

The disclosure is related to a multi-band wireless station and more specifically to a multi-band wireless station that has multiple radios in one frequency band.

BACKGROUND

Wireless access points may be equipped with one or multiple radios and each of the radios are assigned to distinct frequency bands. For example, some access points have two radios, one for 2.4 GHz band and another for 5 GHz band. A wireless local area network (WLAN) client station, such as a cell phone, laptop, and a tablet, communicate with the access point in one or more frequency bands. In some instances, a laptop client may be equipped with one or more WLAN radios which are designed to communicate in one of the multiple supported bands, for example, in either the 2.4 GHz band or the 5 GHz band.

Though the wireless access point can communicate simultaneously in two different bands with client stations, often client stations communicate with the wireless station in a single band and once they are associated with the wireless access point in a particular band they continue to communicate with the wireless access point in the same band. As the number of client stations communicating with a wireless access point increase, the number of client stations communicating in a particular frequency band also increases, thereby causing an increase on the load on the wireless access point in that particular band. Moreover, the interference from other wireless (Wi-Fi) networks close by, e.g., within the range of the wireless access point, or other types of devices which are active in unlicensed band can change over time and the capacity of each sub-band can change over time.

Many wireless access points do not provide load balancing features, which help in balancing the load on the wireless access point so that the client stations that are connected to the wireless point do not experience a decrease in the data rates or a delay in streaming data. Some of them which do provide, balance the load by moving client stations between two or more distinct bands. The conventional access point does not provide load balancing within a single band.

SUMMARY

The disclosure is related to a multi-band wireless station, e.g., a wireless router, a wireless access point, that includes more than one wireless radio in the same frequency band. The multi-band wireless station ("wireless station") operates at multiple frequency bands, e.g., 2.4 GHz and 5 GHz. Further, the wireless station includes multiple radios in the same frequency band. That is, the wireless station can have one radio for a first sub-band and another radio for a second sub-band of a particular frequency band. For example, the wireless station can have two radios for the 5 GHz band— one radio for a lower frequency range of the 5 GHz band, e.g., 5180 MHz, and another radio for higher frequency range of the 5 GHz band, e.g., 5825 MHz. In some embodiments, the wireless station is a wireless access point and may be operated as a traditional access point, a soft access point, a device in peer to peer connection, or other forms that Wi-Fi devices may operate.

The client stations can connect to the wireless station at any of the frequency bands based on the capability of the radios of the client stations. For example, a dual-band client station that operates at 2.4 GHz or 5 GHz can connect to the wireless station at the 2.4 GHz or 5 GHz bands. Further, if the client station is connecting to the 5 GHz band, it can either connect to the first sub-band or the second sub-band of the 5 GHz. In some embodiments, the wireless station decides the sub-band to which a particular client station has to be assigned to or associated with.

The wireless station determines the sub-band to which the particular client station has to be assigned based on a number of assignment attributes. An assignment attribute can include one or more of (a) a load, e.g., available airtime, at a particular sub-band, (b) a link rate with a particular client station on a particular band, (c) a received signal strength indicator (RSSI) of a signal received from the particular client station at a particular sub-band, (d) distance of a particular client station from the wireless station, (e) hardware configuration of a particular client station, (f) an application of a client station that is requesting the airtime of the wireless station, (g) interference at a particular sub-band, etc. Once the client station is assigned to a particular sub-band, the client station can continue to connect the same sub-band for subsequent connections. However, in some embodiments, a client station may be moved from one sub-band to another sub-band, e.g., reassigned to another sub-band, if values of any of the assignment attributes change.

The wireless station chooses the best channel from among the available channels in the assigned frequency range for each of the sub-bands as a primary channel. The channels are graded based on various channel grading factors and, in some embodiments, the channel with the best grade is selected as the primary channel and another channel or set of channels, e.g., with next best grade, are selected as the secondary channel. For example, a 80 MHz frequency range can have one primary channel, one secondary 20 MHz channel and one secondary 80 MHz channel. In some embodiments, the primary channel is used to carry control data, e.g., beacon, and the secondary channel is used to transmit the data. The primary and secondary channels are continuously monitored, and the wireless station changes the primary and/or secondary channels to another channel if necessary, e.g., when the grades of the current primary and/or secondary channels drop below a threshold.

DETAILED DESCRIPTION

Figure 1:
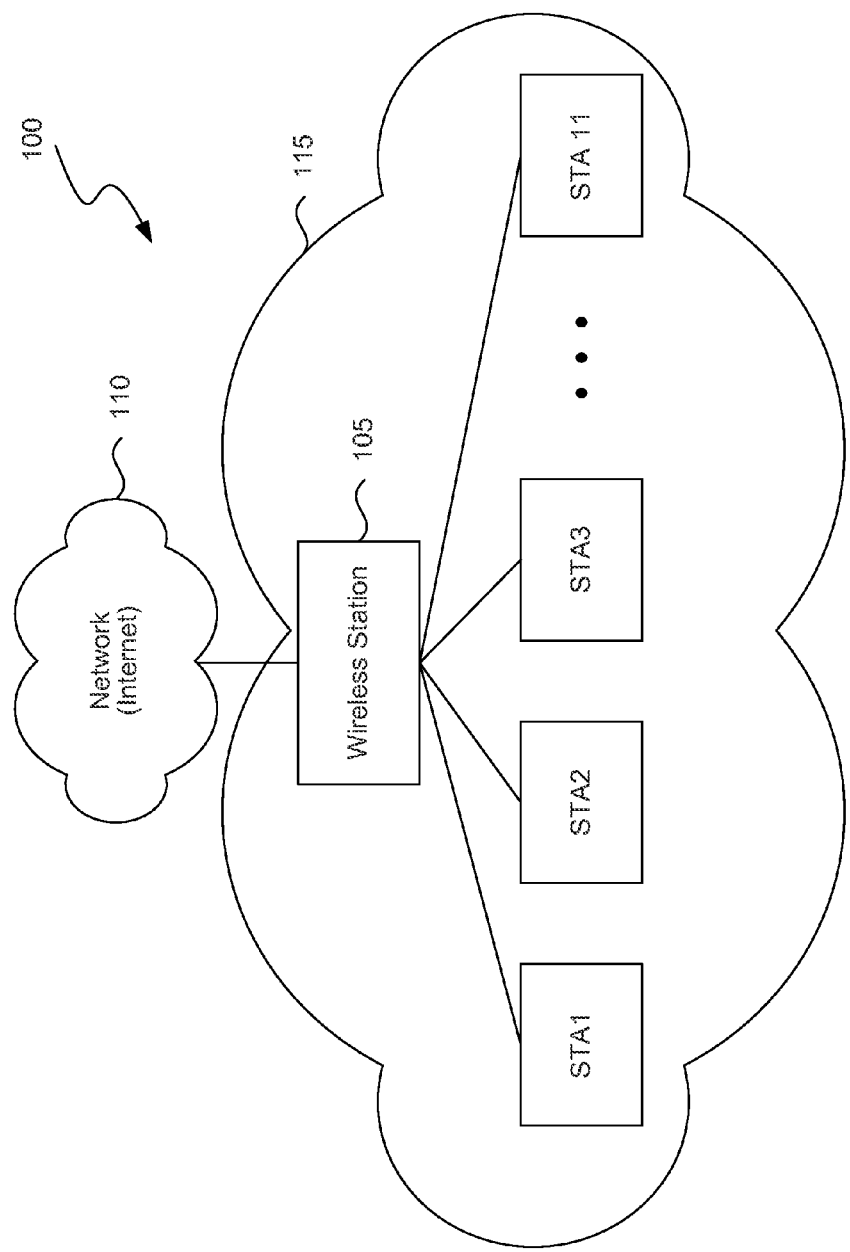
FIG. 1 is a block diagram illustrating an environment in which the wireless station can be implemented.

The disclosure is related to a multi-band wireless station, e.g., a wireless router, a wireless access point, that includes more than one wireless radio in the same frequency band. The multi-band wireless station ("wireless station") operates at multiple frequency bands, e.g., 2.4 GHz and 5 GHz. Further, the wireless station includes multiple radios in the same frequency band. That is, the wireless station can have one radio for a first sub-band and another radio for a second sub-band of a particular frequency band. For example, the wireless station can have two radios for the 5 GHz band—one radio for a lower frequency range of the 5 GHz band, e.g., 5180 MHz, and another radio for higher frequency range of the 5 GHz band, e.g., 5825 MHz. In some embodiments, the wireless station is a wireless access point and may be operated as a traditional access point, a soft access point, a device in peer to peer connection, or other forms that Wi-Fi devices may operate.

The client stations can connect to the wireless station at any of the frequency bands based on the capability of the radios of the client stations. For example, a dual-band client station that operates at 2.4 GHz or 5 GHz can connect to the wireless station at the 2.4 GHz or 5 GHz bands. Further, if the client station is connecting to the 5 GHz band, it can either connect to the first sub-band or the second sub-band of the 5 GHz. In some embodiments, the wireless station decides the sub-band to which a particular client station has to be assigned to or associated with.

The wireless station determines the sub-band to which the particular client station has to be assigned based on a number of assignment attributes. An assignment attribute can include one or more of (a) a load, e.g., available airtime, at a particular sub-band, (b) a link rate with a particular client station on a particular band, (c) a received signal strength indicator (RSSI) of a signal received from the particular client station at a particular sub-band, (d) distance of a particular client station from the wireless station, (e) hardware configuration of a particular client station, (f) an application of a client station that is requesting the airtime of the wireless station, (g) interference at a particular sub-band, etc. Once the client station is assigned to a particular sub-band, the client station can continue to connect the same sub-band for subsequent connections. However, in some embodiments, a client station may be moved from one sub-band to another sub-band, e.g., reassigned to another sub-band, if values of any of the assignment attributes change.

The wireless station chooses the best channel from among the available channels in the assigned frequency range for each of the sub-bands as a primary channel. The channels are graded based on various channel grading factors and, in some embodiments, the channel with the best grade is selected as the primary channel and another channel or set of channels, e.g., with next best grade, are selected as the secondary channel. For example, a 80 MHz frequency range can have one primary channel, one secondary 20 MHz channel and one secondary 80 MHz channel. In some embodiments, the primary channel is used to carry control data, e.g., beacon, and the secondary channel is used to transmit the data. The primary and secondary channels are continuously monitored, and the wireless station changes the primary and/or secondary channels to another channel if necessary, e.g., when the grades of the current primary and/or secondary channels drop below a threshold.

FIG. 1 is a block diagram illustrating an environment in which the wireless station can be implemented. The environment 100 includes a multi-band wireless station 105 that facilitates a number of client stations, e.g., "STA 1"-"STA 11," to access a communication network 110 or one of the client stations in the WLAN 115. The client stations connected to the wireless station 105 and the wireless station 105 form the WLAN 115. The communication network 110 enables the client stations to access various resources connected to the communication network 110. Examples of wireless station 105 can include a wireless router, a wireless access point, a wireless gateway, etc. The wireless station 105 operates at multiple frequency bands. Examples of the frequency bands include the 2.4 GHz and 5 GHz bands used by devices operating under IEEE 802.11 and WFA (Wi-Fi alliance) protocols. The communication network 110 can be Internet, intranet, WLAN, etc. The wireless station 105 facilitates a client station to access the resources connected to the communication network 110 and/or other client stations in the WLAN 115.

Examples of a client station include a cell phone, including a smartphone, a tablet, a laptop, and a desktop, media streaming devices such as Apple TV, Amazon Fire TV, Google Chromecast, etc., another wireless station or any other device that is capable of communicating with the wireless station 105. The client stations can communicate with the wireless station via wired connection or wirelessly. In some embodiments, the client stations communicate with the wireless station 105 wirelessly. The client stations can communicate with the wireless station 105 or another client station in the WLAN 115 over one or more frequency bands. Examples of frequency bands include, but are not limited to, the 2.4 GHz and 5 GHz bands used by devices operating under IEEE 802.11 and WFA protocols.

Figure 2A:
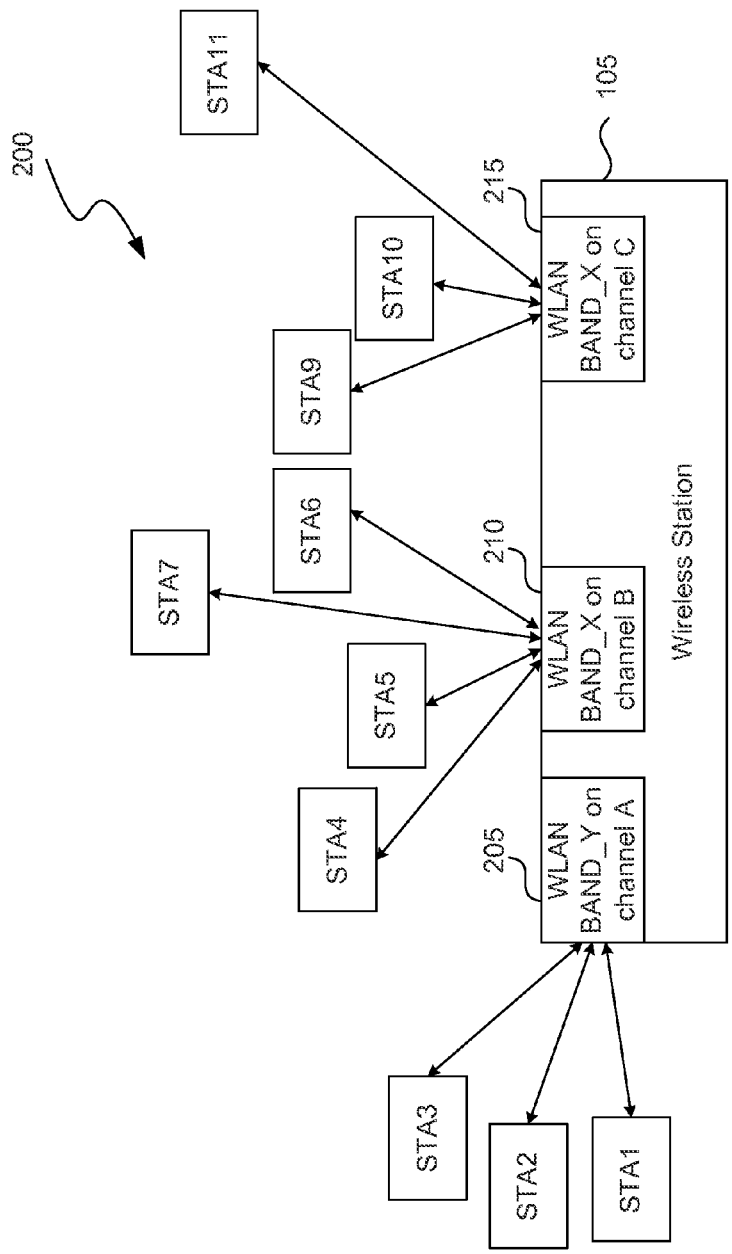
FIG. 2A illustrates a wireless station of FIG. 1 operating at multiple frequency bands, consistent with various embodiments.

FIG. 2A illustrates a wireless station of FIG. 1 operating at multiple frequency bands, consistent with various embodiments. The wireless station 105 includes a first radio 205 operating in a first frequency band, e.g., band Y, a second radio 210 and a third radio 215 operating at a second frequency band, e.g., band X. The bands X and Y can be any of permissible bands used for communication, e.g., industrial, scientific and medical (ISM) radio bands. The second radio 210 operates in a first sub-band of the frequency band, band X, and the third radio 215 operates in a second sub-band of the frequency band, band X. The first sub-band and the second sub-band operate at distinct frequency ranges of the frequency band, band X.

The client stations "STA 1" to "STA 11" can wirelessly connect to and/or communicate with the wireless station 105 over multiple bands and/or one or more other client stations in the WLAN 115. For example, client stations "STA 1"-"STA 3" can communicate with the wireless station 105 using one or more channels in the frequency band, band Y. The client stations "STA 4"-"STA 7" can communicate with the wireless station 105 using one or more channels in the first sub-band of the frequency band, band X. The client stations "STA 9"-"STA 11" can communicate with the wireless station 105 using one or more channels in the second sub-band of the frequency band, band X.

Figure 2B:
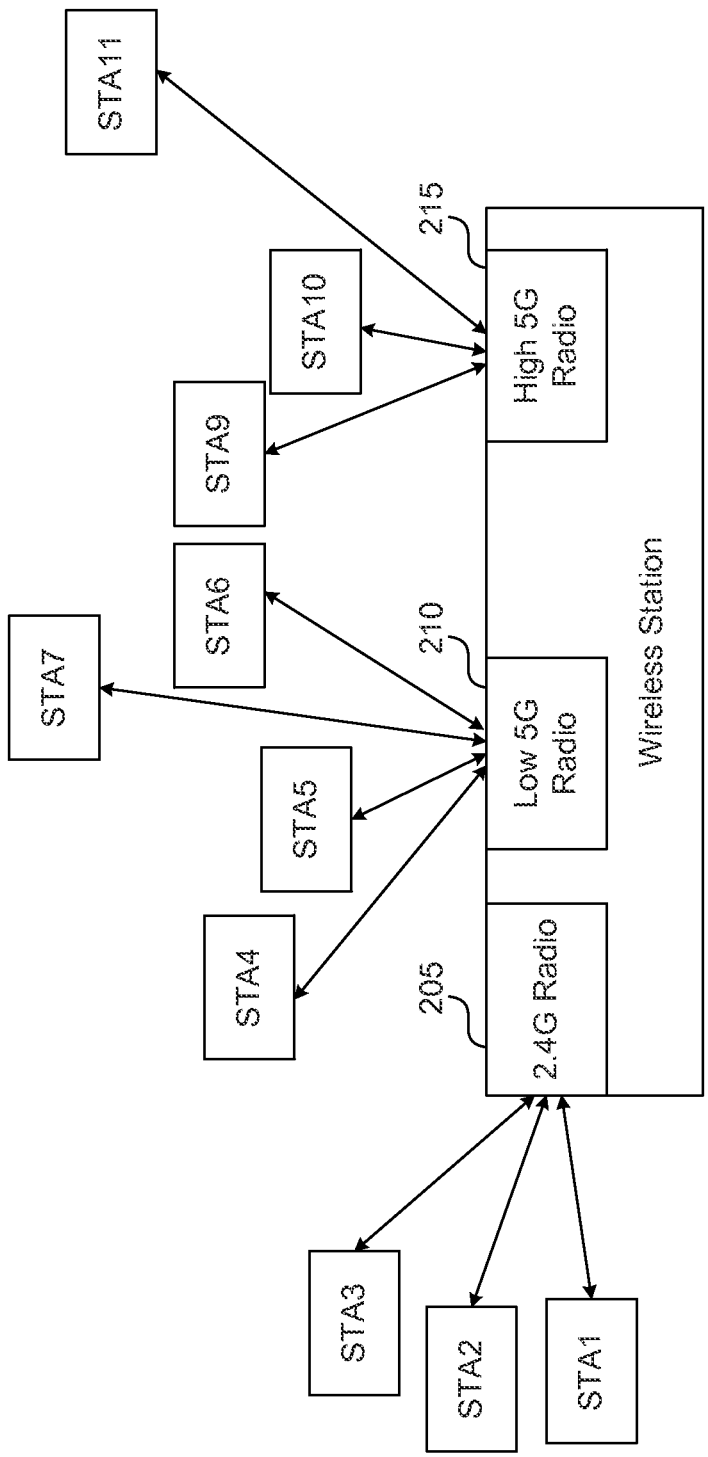
FIG. 2B illustrates a wireless station of FIG. 1 operating at 2.4 GHz and 5 GHz bands and having multiple radios in 5 GHz band, consistent with various embodiments.

FIG. 2B illustrates a wireless station of FIG. 1 operating at 2.4 GHz and 5 GHz bands and having multiple radios in 5 GHz band, consistent with various embodiments. The wireless station 105 includes a first radio 205 operating at 2.4 GHZ, a second radio 210 and a third radio 215 operating at 5 GHz frequency band. The second radio 210 operates in a first sub-band of the 5 GHz frequency band and the third radio 215 operates in a second sub-band of the 5 GHz frequency band. The first sub-band and the second sub-band are distinct frequency ranges in the 5 GHz frequency band. In some embodiments, the second radio 210 operates in a lower frequency range of the 5 GHz frequency band, e.g., 5180 MHz, and the third radio 215 operates in a higher frequency range of the 5 GHz frequency band, e.g., 5825 MHz.

The client stations can connect to any of the bands, that is, the 2.4 GHz band, a first sub-5 GHz band or the second sub-5 GHz band. In some embodiments, the client stations connect to a particular band based on their hardware configuration. For example, if a client station is equipped with a radio that operates only at 2.4 GHz band, then the client station connects to the wireless station 105 at the 2.4 GHz band. In another example, if the client station is dual band, e.g., equipped with both 2.4 GHz and 5 GHz bands, then the client station may either connect to the 2.4 GHz or the 5 GHz band. In some embodiments, the client station may connect to the 5 GHz band instead of the 2.4 GHz since the chances of interference in 2.4 GHz is higher, which affects the data speed or throughput of the wireless station. For example, if the client station is connected to a wireless access point installed in a home, and a microwave oven in the home is turned on, a connection to the access point over the 2.4 GHz band may deteriorate due to interference because the microwave oven has emissions in the 2.4 GHz band. Similarly, baby monitors also operate on the 2.4 GHz band; so if a baby monitor is close to a cell phone or an access point, the connection is also likely to deteriorate. Bluetooth devices are another class of wireless devices that may be active in the 2.4 GHz band. Moreover, undesired noise may be emitted in the ISM bands from other devices in the home.

When a client station connects to the 5 GHz band, the wireless station 105 assigns the client station to one of the sub-bands of the 5 GHz band. As illustrated in FIG. 2B, the wireless station 105 has assigned the client stations "STA 4"-"STA 7" to the low 5 GHz band and the client stations "STA 9"-"STA 11" to the high 5 GHz band. In some embodiments, the association or the assignment of the client station to a particular sub-band is done when the client station connects to the wireless station 105 for the first time. The wireless station 105 assigns the client station to a particular sub-band based on assignment criteria, which is a function of a number of assignment attributes, including a load of the wireless station 105 in a particular sub-band. After the client station is assigned to the particular sub-band, the client station typically connects to the same sub-band on subsequent connections.

It is often required to balance the load on the wireless station in order to minimize any adverse effect on data throughput due to an increasing number of client stations. Further, if all the client stations connect to only one particular sub-band, while the data throughput of the wireless station 105 decreases in the particular sub-band, the wireless station 05 is not utilized or under-utilized in the other sub-band, which makes the wireless station 105 inefficient. Some conventional wireless stations load balance the client stations between different frequency bands, e.g., between the 2.4 GHz band or the 5 GHz band, but not within the same frequency band.

Figure 3:
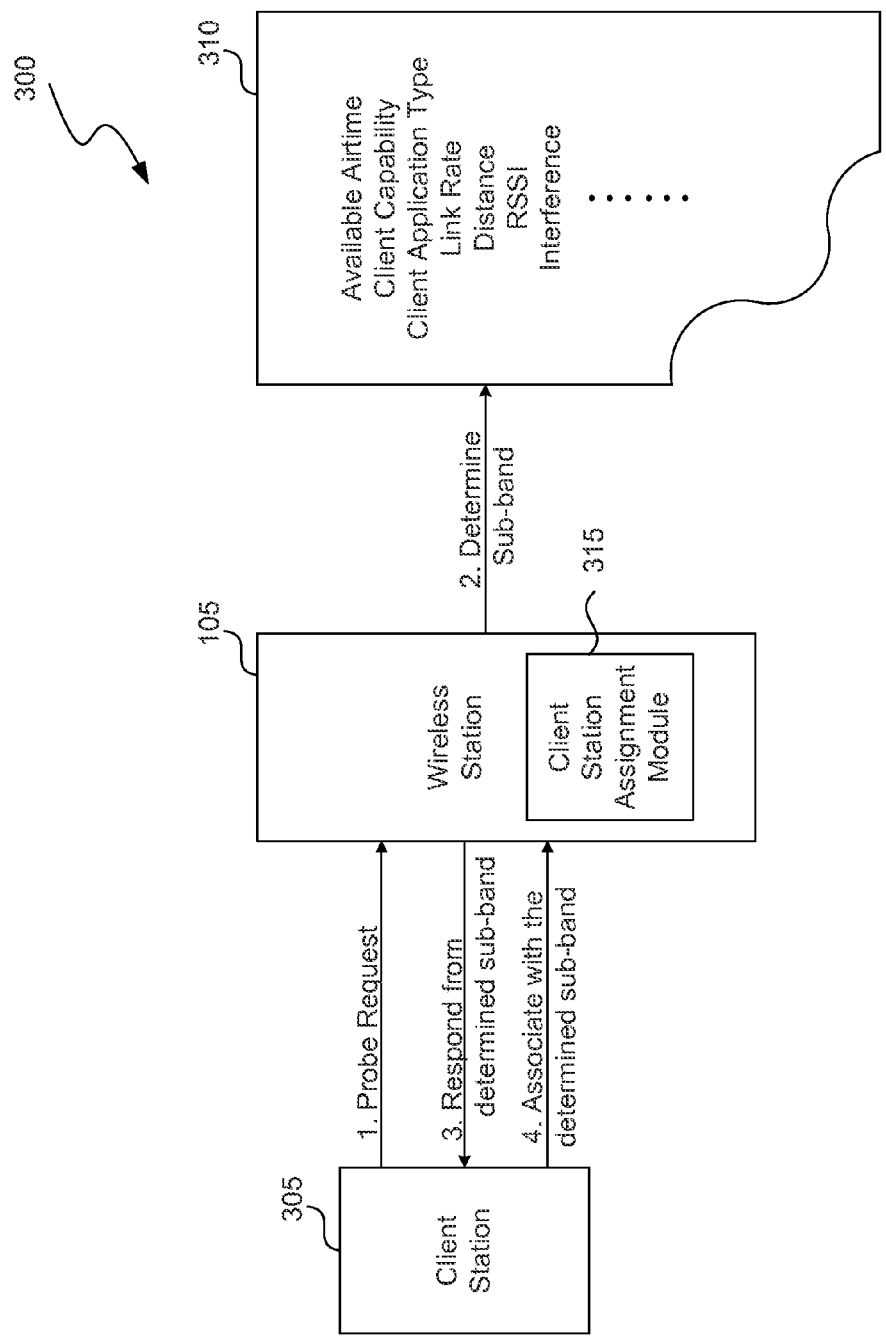
FIG. 3 illustrates an example of performing load balancing on the wireless station of FIG. 1 between sub-bands of a frequency band, consistent with various embodiments.

FIG. 3 illustrates an example 300 of performing load balancing on the wireless station of FIG. 1 between sub-bands of a frequency band, consistent with various embodiments. In some embodiments, the load balancing is performed by assigning a client station to one of the multiple sub-bands of a frequency band based on assignment criteria. The client station assignment module 315 (also referred to as "load balancing module 315") determines a particular sub-band to which a client station is to be assigned on the assignment criteria, which is a function of a number of assignment attributes 310. The assignment attributes 310 include one or more of (a) available airtime on each of the sub-bands, (b) capability of a client station, e.g., hardware configuration, (c) a type of the application on the client station that is requesting airtime of the wireless station, (d) a link rate between the wireless station 105 and the client station in a particular sub-band, (e) a distance between the client station and the wireless station 105, (f) a RSSI of the signal from the client station on a particular sub-band, (g) transmission power of each of the sub-bands, (h) interference in each of the sub-bands, etc.

The example 300 illustrates assigning a client station 305, which can be similar to the client stations of FIG. 1, to one of a low 5 GHz and high 5 GHz sub-bands of the 5 GHz band. Note that while the disclosure describes the wireless station 105 as having two sub-bands of 5 GHz band, e.g., one in low 5 GHz and another in high 5 GHz sub-bands, the wireless station 105 is not limited to having sub-bands for the 5 GHz band; the wireless station 105 can have sub-bands for other suitable frequency bands. Further, the number of sub-bands supported by the wireless station 105 in a frequency band can also be more than two. Further, the wireless station 105 is not limited to having one sub-band in a lower frequency range of the frequency band and another sub-band in the higher frequency range of the frequency band. The sub-bands can be of any distinct frequency ranges within a particular frequency band.

In some embodiments, the wireless station 105 can be a wireless access point in a home and the client station 305 can be a smartphone. Further, the client station 305 connects to the wireless station 105 in the 5 GHz frequency band. When the client station 305 sends a probe request to the wireless station 105 requesting for connecting with wireless station 105, the load balancing module 315 determines if the client station 305 is already assigned to one of the sub-bands of 5 GHz band, e.g., from a previous connection. If the client station 305 is already assigned to one of the sub-bands, the wireless station 105 responds to the probe request from the assigned sub-band. If the client station 305 is not assigned to a sub-band, the load balancing module 315 determines the sub-band to which the client station 305 can be assigned, assigns the client station 305 to the particular sub-band, which is determined based on the assignment attributes 310, and then responds to the client station 305 from the particular sub-band. The client station 305 is then associated with the assigned sub-band. Any subsequent requests from the client station 305 to connect with the wireless station 105 is automatically assigned to the assigned sub-band unless the load balancing module 315 determines to reassign the client station 305 to another sub-band for various reasons, e.g., for balancing the load on the wireless station 105.

Load Balancing

One of the goals of the load balancing/sub-band assignment process is to maximize the network capacity constrained to the quality of service (QoS) requirement of the client stations. The following paragraphs describe how the load balancing/assignment of the client station 305 is performed based on the assignment attributes 310.

Load Balancing Based on Capability of a Client Station

Different client stations have different capabilities, e.g., hardware configuration. For example, some client stations operate using IEEE 802.11a/b/g protocols and some client stations operate using 802.11n/ac/ad/ah/aj/ax protocols in addition to 802.11a/b/g protocols. Typically, 802.11a/b/g client stations have slower speed than 802.11n/ac client stations. Accordingly, in some embodiments, 802.11a/b/g client stations consume more airtime of the wireless station 105 than the 802.11n/ac/ax client stations. Further, in some embodiments, the number of antennas the client stations have also have an effect on the data transfer rates between the client stations and the wireless station 105. In some embodiments, lesser the number of antennas, the lower the data rate and higher the consumed airtime. In some embodiments, the capabilities of a client station is determined as a function of the IEEE 802.11 protocols they can communicate using, the number of antennas they have, etc.

Following are some example of the physical (PHY) rate of client stations with various capabilities. The rate at physical layer is the speed at which client stations can communicate with the wireless station 105. The (x*y) indicates the number of antennas a client station has for transmitting and receiving. For example, 2*2 indicates that a client station has two antennas for transmitting and two antennas for receiving. In some embodiments, the higher the number of antennas, the higher the data throughput rate between a client station and the wireless station 105.

802.11a/g peak physical data rate is 54 Mbps
HT20 802.11n 1×1 peak Physical layer rate is 72.2 Mbps
H40 802.11n 1×1 peak Physical layer rate is 144.4 Mbps
HT40 802.11n 2×2 peak Physical layer rate is 300.0 Mbps
HT40 802.11n 3×3 peak Physical layer rate is 450 Mbps
HT80 802.11ac 3×3 peak Physical layer rate is 1300.0 Mbps.

As illustrated, the physical layer rate is lower for client stations that are less capable, e.g., client stations that operate using slower 802.11 protocols. Further, the 11ac client at peak is 24 times faster than an 11a client at peak.

In some embodiments, the throughput of the client stations which are using same sub-band is limited by the physical layer rate of the slowest active client station communicating with the wireless station 105. The physical layer rate of the lowest data rate client directly affects the data throughput rate between all the other client stations and the wireless station 105 because a slow client can spend more time sending or receiving packets compared to a high speed physical rate client, therefore limiting the total available airtime to high speed clients. Accordingly, if a slower 802.11a/b/g client station and a faster 802.11n/ac client station are assigned to the same sub-band, the data throughput rate between the faster 802.11n/ac client station and the wireless station 105 will be reduced, e.g., substantially, by the data throughput rate between the slower 802.11a/b/g client station and the wireless station as the lower rate client will occupy more airtime it has application layer data to transmit 105. So the load balancing module 315 assigns client stations with similar client capabilities to a particular sub-band. For example, the load balancing module 315 can assign the slower 802.11a/b/g client stations to one sub-band and the faster 802.11n/ac client stations to another sub-band, in order to minimize the effect of the slower 802.11a/b/g client stations on the faster 802.11n/ac client stations. Accordingly, when the client station 305 sends a probe request, the load balancing module 315 determines the capability of the client station 305 as one of the assignment criteria to select a sub-band to which the client station 305 has to be assigned. In some embodiments, information regarding the client station capabilities, e.g., the hardware configuration information discussed above, is included in the probe request. In some embodiments, the probe request which is transmitted by a client station on a sub-band which is not the intended sub-band for that client station may not be responded.

Load Balancing Based on Link Quality, Distance or RSSI

A RSSI of the signal received from the client station 305 may be used the load balancing module 315 to decide which sub-band and band to be used for association. The RSSI is a measurement of the power present in a received radio signal. The higher the power, the better the link quality, which can result in better data throughput rate between the client station 305 and the wireless station 105. In some embodiments, the RSSI is a function of the distance between the client station 305 and the wireless station 105. The RSSI is inversely proportional to the distance. So, if the RSSI is below a threshold, in one example, the load balancing module 315 can assign to the client station 305 to a band or a sub-band in which the transmission power is higher. For example, the load balancing module 315 can assign the client station 305 to the high 5 GHz sub-band.

In some embodiments, the more accurate measure for the link quality is packet error rate (PER) and data rate. In some embodiments, the PER is a function of the number of incorrectly received data packets and the total number of received packets. The data rate is the rate at which the wireless station 105 transmits the data packets to the client station 305. The lesser the data rate, the lesser the link quality. In some embodiments, the data rate is inversely proportional to the distance between the client station and the wireless station 105. The wireless station 105 knows the PER that are used in the downlink and the data rates that are used in the uplink.

In some embodiments, the assignment of the client station 305 to a band/sub-band is done at the time of associating the client station 305 with the wireless station 105 when the client station 305 is not known to the wireless station 105. The PER and RSSI can be continuously monitored and used to move a client station from one band/sub-band to another band/sub-band when the client station is not active, or it can be used for decision making next time the client station tries to associate with the wireless station 105.

In some embodiment, a packet delay or packet delay variation ("jitter") may be used as a parameter to pick the sub-band for each client. The clients that require low delay may be associated to one band while other clients to another band. Or the clients which have small tolerance in delay variation may be associated to one band.

Load Balancing Based on Interference

Interference can adversely impact the data throughput rate between the client stations and the wireless station 105. Further, the interference can be of different degrees on different channels in a frequency band. In some embodiments, there are known sources of interference on the wireless station 105. For example, the interference can be between the two 5 GHz radios, especially interference from high 5 GHz to low 5 GHz, which can be a key factor on performance of the 5 GHz radio. There can be interference from USB 3.0 to 2.4 GHz band. In some embodiments, non-WLAN interference may also be measured based non-WLAN energy. There may be in-band interference from LTE operation in 5 G unlicensed band. There may be out of band LTE interference to 2.4 G or 5 G band from various LTE bands.

Based on the measured interference on the operating channel, the available WLAN airtime and the link quality can be calculated, and based on the available airtime, the load balancing module 315 can determine the number of client stations and the type of client stations, e.g., client stations operating on 2.4 GHz only, client stations operating on 2.4 GHz or 5 GHz, client stations communicating using certain 802.11 protocols, that will be supported.

In some embodiments, the interference from one radio to the other radio in the wireless station 105 can be minimized by adjusting the transmission power level in one or both of the radios. For example, the interference from high 5 GHz radio to low 5 GHz radio can be minimized by adjusting the power levels on one or both of them.

The amount of interference that each sub-band creates on another is the transmit power of that sub-band minus the isolation between the two bands. The amount of interference from each band to other band may be reduced if the transmit power of that band is reduced. The transmit power on a band may be reduced if the client stations on that band can sustain an acceptable data throughput rate.

Load Balancing Based on Channel Utilization/Application Type of the Client Stations In some embodiments, the load balancing module 315 assigns the client station 305 based on an application type of the client station 305 that is requesting access to the wireless station 105. For example, applications such as video streaming applications, voice over internet protocol (VOIP) applications, video/audio conferencing applications or similar real-time or near real-time applications have lesser tolerance to a drop in data throughput rates or the data rates between the client station and the wireless station 105. These applications expect minimum delay and minimal delay variation (i.e. jitter) in communication between the client station and the wireless station. Accordingly, the client stations with these type applications may need maximum airtime of the wireless station 105. On the other hand, applications like email clients, file downloading applications like BitTorrent have a higher level of tolerance to a drop in the data throughput rate. So the load balancing module 315 can assign the client stations with such demanding applications, e.g., the applications that have lesser tolerance to a drop in data throughput rates, to one sub-band and the other applications to another sub-band.

For example, the load balancing module 315 can assign the client station with the demanding applications to the low 5 GHz sub-band and other less demanding applications to the high 5 GHz sub-band. The performance/data throughput rates are typically better when the client stations are closer to the wireless station 105 than farther. While closer client stations may be able to connect to either the low 5 GHz sub-band or the high 5 GHz sub-band, the farther client stations may not be able to connect to the low 5 GHz sub-band, or even if they connect, they can experience slow data throughput rates. Accordingly, in some embodiments, the farther client stations can be connected to the high 5 GHz sub-band, and the closer client stations having demanding applications can be assigned to the low 5 GHz sub-band. So when the client station 305 sends the probe request to the wireless station 105, the load balancing module 315 considers the type of application of the client station 305 that is requesting airtime from the wireless station 105.

Typically, most of the devices that are used in homes have similar traffic patterns over time. For example, streaming devices like Apple TV, Roku, and Google Chromecast can stream huge amounts of video data. In another example, a gaming device like Microsoft Xbox can also consume huge amounts of data and may also stream content in real time. The type and amount of traffic and load of the associated client stations may be monitored and based on the channel utilization or the airtime consumed by these client stations, the load balancing module 315 can assign the client stations or modify their assignments to suitable sub-bands.

In some embodiments, the load balancing module 315 can generate a profile containing data access patterns for each of the client stations. The profile can be used for determining what type of a device a client station is, the type of data and times at which the data is accessed by the client stations, the client station capabilities, etc. The profile can be used in deciding the sub-band assignment.

In some embodiments, there is overlapping basic service set (OBSS) WLAN activity from neighboring wireless stations that can be measured on the wireless station 105 to determine how much WLAN airtime is left for the wireless station 105. Based on the channel utilization per known client station, the sub-band assignment may be modified.

Figure 4:
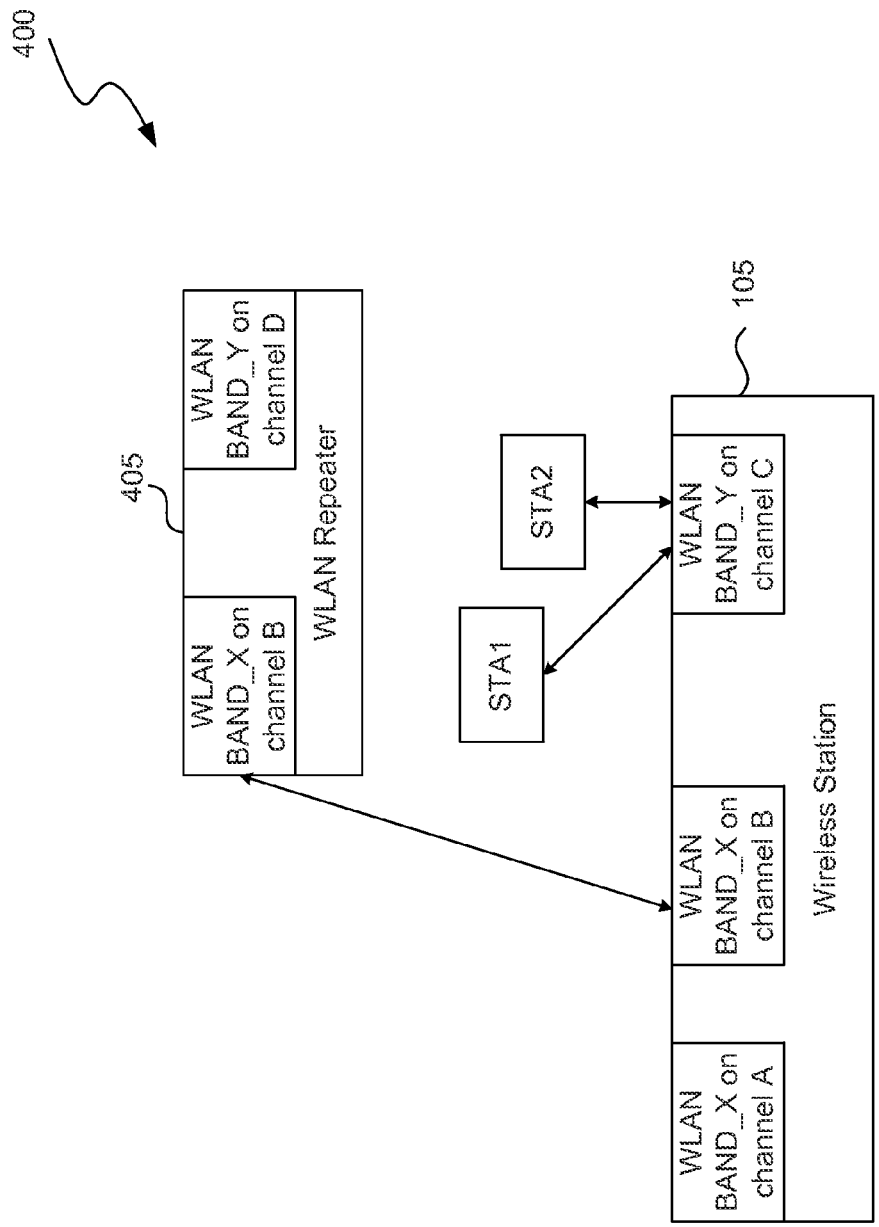
FIG. 4 illustrates an example in which a dual-band wireless repeater is deployed in the WLAN, consistent with various embodiments.
Figure 5:
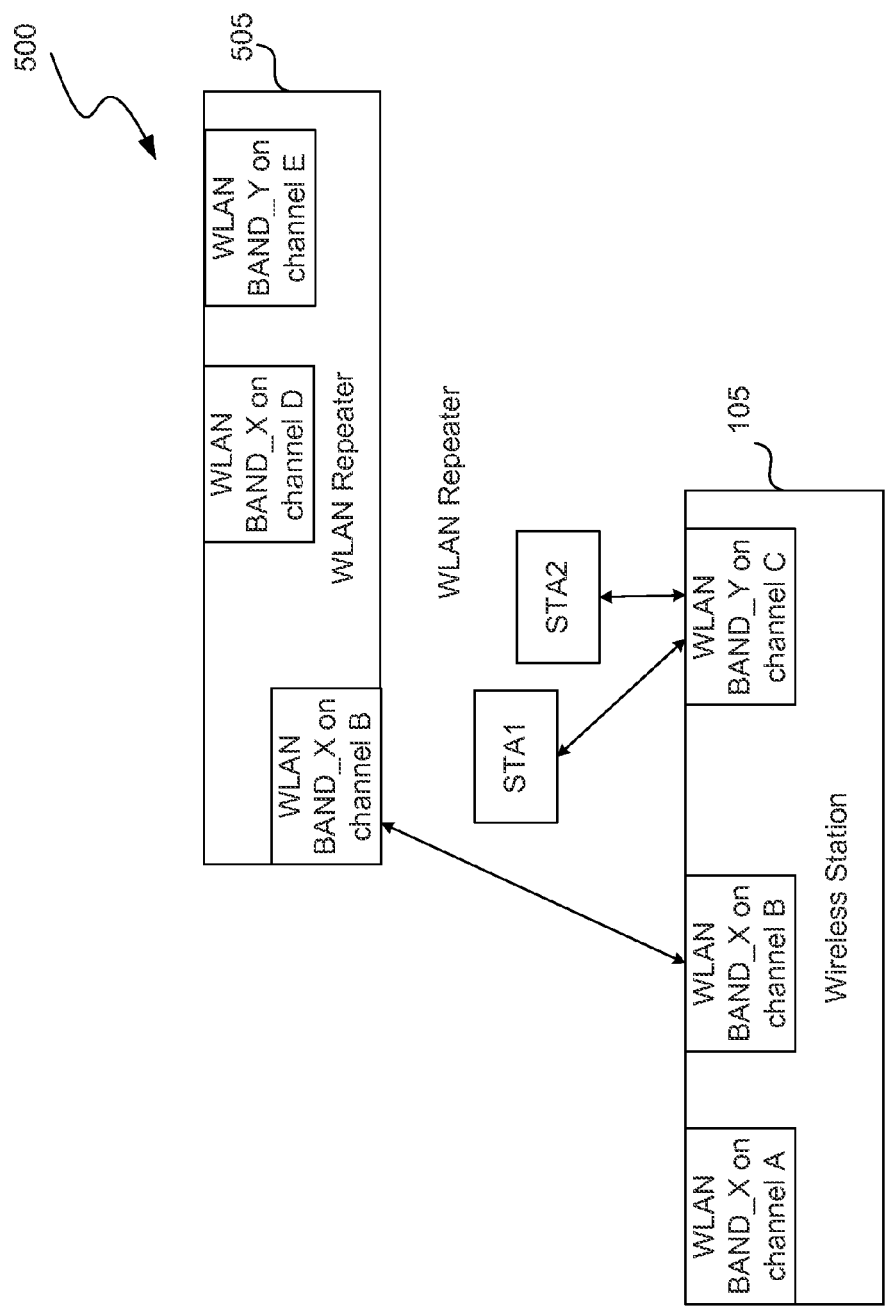
FIG. 5 illustrates an example in which a tri-band wireless repeater is deployed in the WLAN, consistent with various embodiments.
Figure 6:
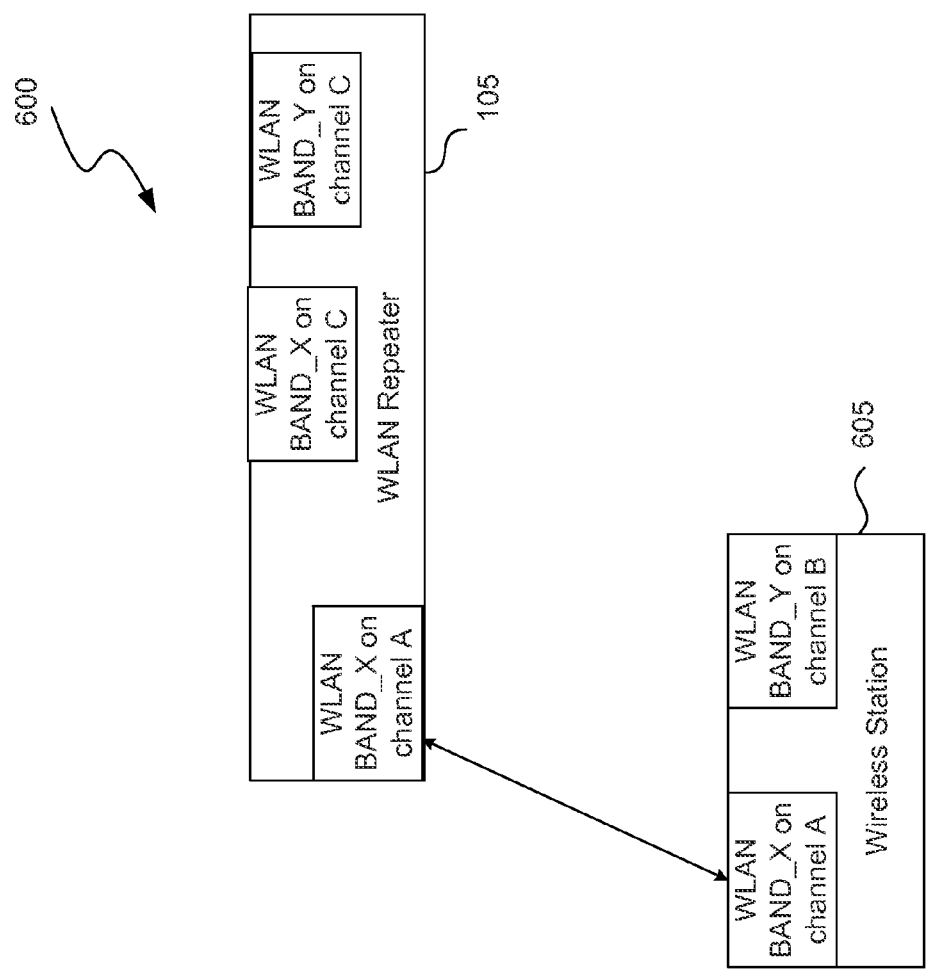
FIG. 6 illustrates an example in which the wireless station can be deployed as wireless repeater in the WLAN that repeats the signal of a multi-band wireless access point, consistent with various embodiments.

Load Balancing Based on a Functionality/Type of a Client Station, e.g., a Wireless Repeater In some embodiments, a sub-band assignment may be performed based on the functionality of or a type of the client station. For example, if the client station 305 is a wireless repeater, the airtime requested by the wireless repeater is typically higher than other client stations since the wireless repeater itself is facilitating network access to a number of client stations. In some embodiments, one of the sub-bands may be dedicated to the wireless repeater. FIGS. 4-6 show examples of deploying a wireless repeater of various configurations in the WLAN 115 of FIG. 1.

FIG. 4 illustrates an example 400 in which a dual-band wireless repeater is deployed in the WLAN 115, consistent with various embodiments. The wireless repeater 405 operates on dual-bands, band X and band Y, e.g., 5 GHz and 2.4 GHz, respectively. The wireless repeater 405 wirelessly connects to the wireless station 105 on band X. In the example 400, the load balancing module 315 has assigned the channel B sub-band of the band X to the wireless repeater 405, exclusively. In some embodiments, the wireless repeater 405 and the wireless station 105 can communicate with each other only a common channel, e.g., frequency range.

FIG. 5 illustrates an example 500 in which a tri-band wireless repeater is deployed in the WLAN 115, consistent with various embodiments. The wireless repeater 505 operates on tri-bands, a first sub-band (channel B) of band X, a second sub-band (channel D) of band X and band Y, e.g., low 5 GHz sub-band, high 5 GHz sub-band and 2.4 GHz, respectively. The wireless repeater 405 wirelessly connects to the wireless station 105 on channel B of band X. In the example 500, the load balancing module 315 has assigned the channel B sub-band of the band X to the wireless repeater 505, exclusively. In some embodiments, the wireless repeater 405 and the wireless station 105 can communicate with each other only a common channel, e.g., frequency range.

FIG. 6 illustrates an example 600 in which the wireless station 105 can be deployed as wireless repeater in the WLAN 115 that repeats the signal of a multi-band wireless access point, consistent with various embodiments. The wireless station 105 connects to a multi-band wireless access point, such as the dual-band wireless access point 605 that operates in dual-bands, band X and band Y, e.g., 5 GHz band and 2.4 GHz, respectively. The wireless station 105 wirelessly connects to the wireless access point 605 on channel A of band X. In the example 600, the load balancing module 315 has assigned the channel A sub-band of the band X to the wireless access point 605, exclusively. That is, the load balancing module 315 may not assign other client stations to the channel A sub-band of the band X. In some embodiments, the wireless station 105 and the wireless access point 605 can communicate with each other only a common channel, e.g., frequency range.

Load Balancing Based on Behavior of a Client Station

The client station 305 is considered to be well-behaved or non-sticky if it tried to associate to a different sub-band or band if the wireless station does not respond to the client station 305 on a particular sub-band for a specified period/specified number of requests. If the response is not transmitted to the client station 305 and the client station 305 keeps sending requests without trying the other sub-bands, the client station 305 is not well-behaved or is sticky. A counter may be maintained on the number of consecutive requests that are not responded to in the specified period. If the counter exceeds a specified threshold and the client station 305 does not send request to other sub-bands or bands when it does not receive response, the client station 305 is sticky. If the client station 305 gives up before the counter exceeds the specified threshold and sends a request on any other band/sub-band, the client station 305 is well-behaved.

When the client station 305 sends a probe request/association request/authentication request to a particular sub-band, the wireless station evaluates the assignment attributes 310 to determine if a response should be sent to the client station 305 on the particular sub-band. The load balancing module 315, in addition to the assignment attributes 310, considers the behavior of the client station 305 in terms of moving from one sub-band to the others. The load balancing module 315 may also consider the history of client station as to determine whether the client station 305 was sticky or non-sticky.

In some embodiments, to address the sticky clients, the IEEE protocol may be modified to add some messaging scheme to ask a client station to connect on other part of sub-band or another band. A channel switch announcement (CSA) defined in the IEEE protocol is used for an access point to announce change of channel from a radar band in 5 GHz on non-radar band. The CSA could be part of beacon or could be part of an action frame. In some embodiments, the CSA element and/or extended CSA (defined in the IEEE protocol) used in the beacon and other frames is modified to cover the switch between two different sub-bands on a wireless station. The CSA, which currently addresses moving all the clients from a channel to another channel, can be defined to be targeted to a single client station or group of client stations. For example, the media access control address (MAC) address or association identification (AID) of the client stations may be used to specify the client stations. In some embodiments, when a mobile station associates with a wireless station, the wireless station generates an AID to identify the client station. In another example, beacon or action frames may be used.

Load Balancing—Sending Response Frame to a Client Station

In some embodiments, the timing sensitive clients or demanding clients, e.g., video streaming, VoIP, gaming clients, may be grouped together on one sub-band. A handshake mechanism is defined to detect a video client; the content of the request frame may be modified to say that a client is a video client. In some embodiments, the client capability may be used to group them together. The RSSI and the link quality of a client station on different sub-bands may be taken into account. All of the above assignment attributes 310, in addition to behavior of the client, which can be obtained from the history, may be taken into account when a response frame is sent to the client station.

Load Balancing—Continuous Monitoring of the Assignment Attributes

In some embodiments, the assignment of the client station 305 to a sub-band/band is done initially, e.g., when the client station 305 tries to associates itself with the wireless station 105 for the first time and when the client station 305 was not known to the wireless station 105. However, the assignment attributes 310 are continuously monitored by the load balancing module 315 to determine if one or more of the client stations have to be reassigned to different bands/sub-bands.

The quality of the wireless link per client station is monitored. If the quality of wireless link drops below a specified threshold, the load balancing module 315 determines if it is possible to move the client station 305 to a better band/sub-band, and if yes, the client station 305 will be de-authenticated and/or dissociated from the current sub-band so that the client station moves to a different sub-band. In some embodiments, when the client station 305 is disassociated with a particular sub-band/band, the client station 305 can send the probe request on another sub-band/band.

The software queues per sub-band are also monitored. If the software queues for each of the sub-bands are above a specified threshold, a check is made to see if any of the client stations can be moved to another sub-band. In case the move is possible, the selected client station will be disassociated and/or de-authenticated from the current sub-band/band. In some embodiments, the 802.11 MAC layer maintains several queues for storing the requests from the client stations. An access request from a client station can be categorized into multiple categories, e.g., voice, video, best effort, and background. The wireless station 105 can maintain a queue for each of these access categories for each of the client stations.

Some of the queues in the wireless station 105 are shared between all client stations. In some embodiments, the packets move from the client station specific queue to the shared queue before transmission. The client station specific queue and shared queues can be used to create aggregate packets, which are formed to increase the efficiency. The wireless station can check the state of all relevant queues and if the size of the queues exceeds a threshold, it can mean that the wireless station 105 is getting congested and therefore, the load balancing module 315 should perform appropriate load balancing actions, e.g., move one or more of the client stations to another band/sub-band, to avoid congestion.

The amount of available airtime per sub-band is also monitored. If the available airtime for any of the sub-bands is below a specified threshold, a check is made to see if any of the client stations can be moved to another sub-band. In case the move is possible, the selected client station will be disassociated and/or de-authenticated from the current sub-band/band.

Minimizing Decrease in Throughput Rate by Power Adjustment

The transmission power of each of the sub-bands can be adjusted based on a number of factors. For example, the power can be adjusted based on the capability of the client stations that have been associated to the wireless station 105 on each sub-band, e.g., number of antennas, number of transmit and receive chains, low-density parity-check (LDPC) code, and beam forming. In another example, the power can be adjusted based on how well the client station receives data packets from the wireless station, e.g., based on data rate used for the client station, PER of the client station, data packet size, etc. In yet another example, the power can be adjusted based on the data rate of packets received from the client stations, the RSSI of the client station, the amount of uplink or downlink traffic for the client stations, and the type of traffic for the client stations. For example, the transmit power of high 5 G radio may be reduced when possible to reduce interference on low 5 G.

Automatic Channel Selection for the Sub-Bands

The wireless station 105 chooses the best channel from among the available channels in the assigned frequency range for each of the sub-bands as a primary channel. In some embodiments, the primary channel is used to carry control data of a data packet, e.g., beacon, and the secondary channel is used to transmit the data portion of the data packet.

Figure 7:
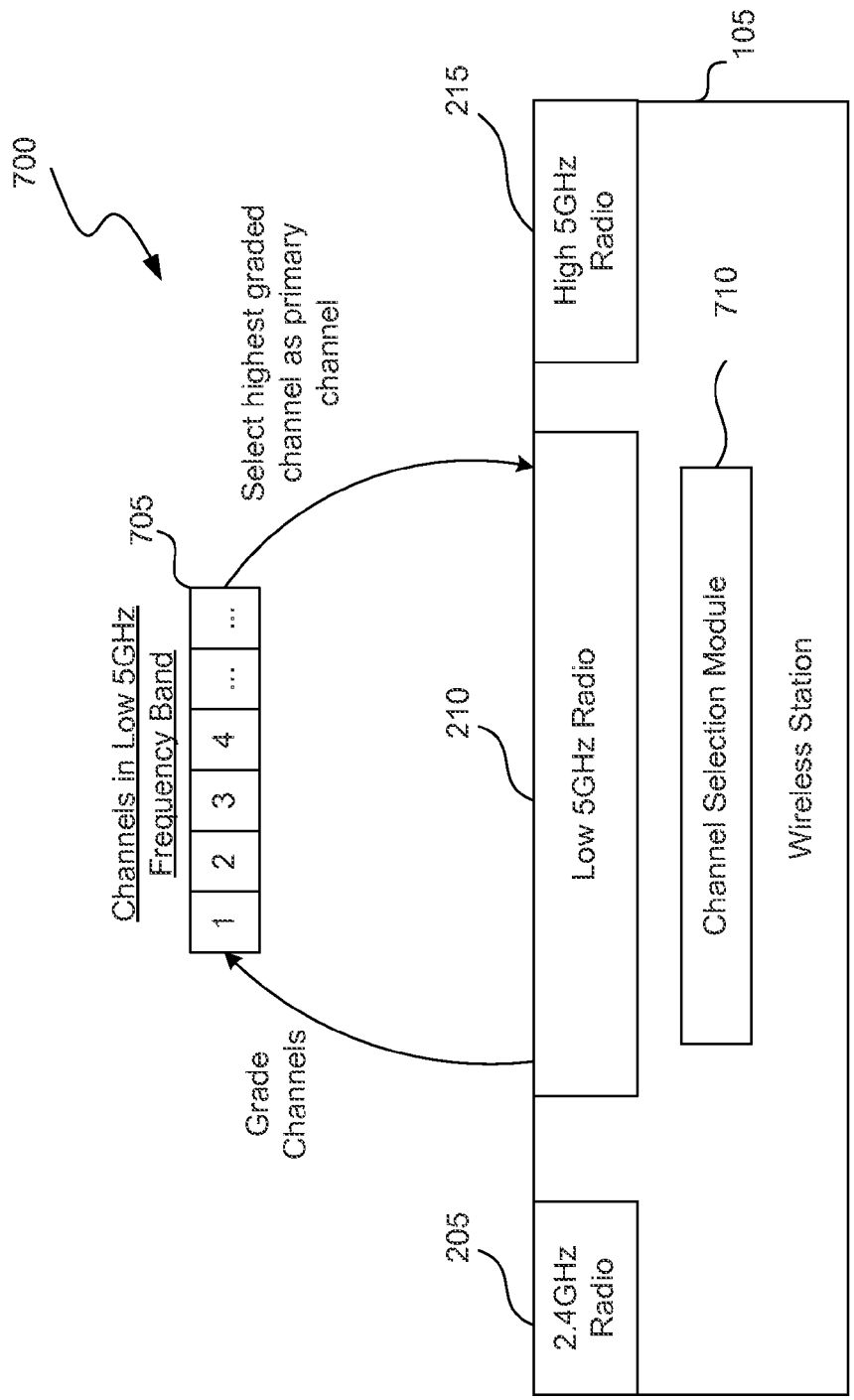
FIG. 7 is an example illustrating selection of a primary channel for a sub-band of a frequency band in the wireless station of FIG. 1, consistent with various embodiments.

FIG. 7 is an example 700 illustrating selection of a primary channel for a sub-band of a frequency band in the wireless station 105 of FIG. 1, consistent with various embodiments. The example 700 describes selecting a primary channel for a low 5 GHz sub-band radio. It should be noted that primary channel selection for other sub-bands is similar to what is described below. A particular portion of the 5 GHz band is determined as a low 5 GHz sub-band 705, e.g., 5180 MHz-5260 MHz, and each channel within the identified low 5 GHz sub-band 705 can be of a specified width, e.g., 20 MHz.

The channel selection module 710 calculates a grade for each of the channels. The channel selection module 710 selects the channel with the best grade as the primary channel because all the management and control frames are sent over the primary channel. In some embodiments, the channel selection module 710 selects another channel, e.g., with next best grade, as the secondary channel. The grade is calculated based on a number of grading factors. For example, the grade is calculated for overlapping and non-overlapping channels. For each WLAN OBSS, the channel selection module 710 adds a negative grade based on the signal strength, amount of activity, and how close the WLAN OBSS is to the channel. The channel selection module 710 adds a negative grade proportional to the level of the noise in the channel. If the noise in the channel is above a specified threshold, the wireless station 105 may not use the channel. The channel selection module 710 adds a negative grade proportional to the interference received from other WLAN devices/sub-band/bands. The channel selection module 710 also considers the transmission power of the channel, rejection, and the amount of activity for grading the channel. The channel selection module 710 also determines the maximum transmission power and the receiver sensitivity for each channel based on which channels are selected, the amount of interference from each interface to the other interface, the range the sub-band is expected to support, and possible user input.

All the used channels are continuously monitored. In case the channel condition on each sub-band is deteriorated, the software checks to see if it can switch the channel with poor performance to another channel. If a switch is possible the channel switch will happen. The channel switch condition is determined based on the list of associated client stations, the type of supported traffic, and the client station capabilities. A CSA may be used at time of switch. Beacon, management, or control frames may be used to do the CSA. For example, a channel switch condition may not be satisfied when a client station, e.g., a smartphone, has a video conference session in progress. In another example, when the client station is idle, that is, there is no active traffic from/to the client station or the traffic is less than a specified threshold, the channel switch condition may be satisfied.

Figure 8:
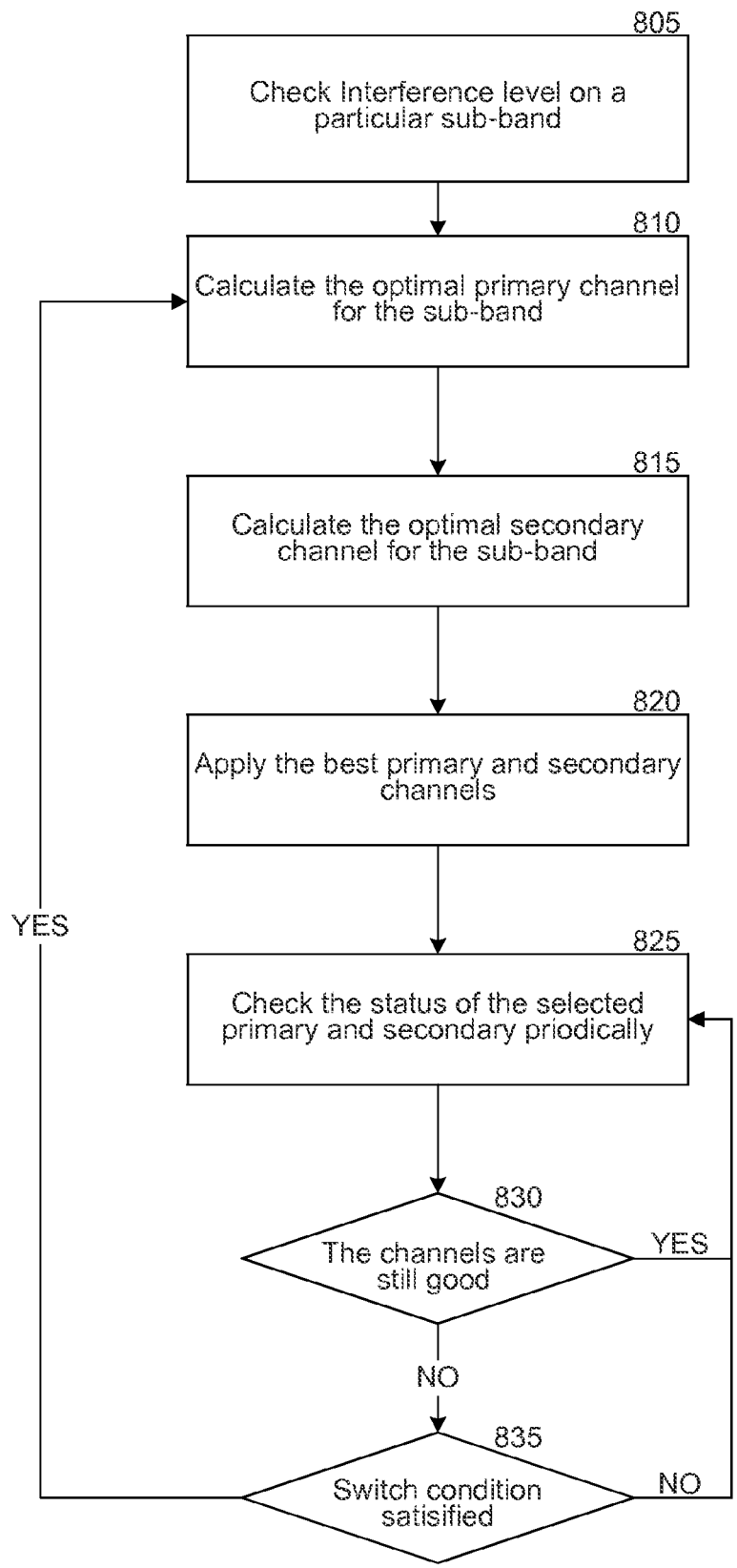
FIG. 8 is a flow diagram illustrating a process for performing channel selection in a wireless station of FIG. 1, consistent with various embodiments.

FIG. 8 is a flow diagram illustrating a process 800 for performing channel selection in a wireless station 105 of FIG. 1, consistent with various embodiments. The process 800 may be executed in the environment 100 of FIG. 1. At block 805, the channel selection module 710 of the wireless station 105 calculates an interference level on a given sub-band of a frequency band. For example, the frequency band can be 5 GHz band and the sub-band can be a low 5 GHz sub-band. In some embodiments, the interference levels can be calculated based on the interference received from other WLAN devices/sub-band/bands.

At block 810, the channel selection module 710 calculates the optimal primary channel for the sub-band. In some embodiments, the channel selection module 710 grades each of the channels of the sub-band, e.g., based on various channel grading factors described above at least with reference to FIG. 7, and selects the channel with the best grade as the primary channel.

At block 815, the channel selection module 710 calculates the optimal secondary channel for the sub-band. In some embodiments, the channel selection module 710 selects the channel with the next best grade to the primary channel as the secondary channel.

At block 820, the channel selection module 710 assigns the selected channels of the sub-band to the corresponding radio of the wireless station 105. In some embodiments, after the channel selection is made, the channel selection module 710 notifies the load balancing module 315 to start the process for monitoring the client station assignments to the sub-band, e.g., process 900 described below.

At block 825, the channel selection module 710 monitors the primary and secondary channels of the sub-band periodically to determine their quality.

At determination block 830, the channel selection module 710 determines whether the channels are good, e.g., whether the grades of the channels has dropped below a specified threshold. If the channel selection module 710 determines that the grades of the channels has not dropped below the specified threshold, that is, the channels are good, the channel selection module 710 continues to keep monitoring the channels at block 825.

On the other hand, if the channel selection module 710 determines that the grades of one or more of the channels has dropped below the specified threshold, at determination block 835, the channel selection module 710 determines if a switch condition is satisfied for switching the channel with poor performance to a better channel. If the switch condition is satisfied, the control of the process 800 is transferred to block 810, where the channel selection module 710 continues to determine the optimal primary and secondary channels and assign them to the particular sub-band. If the switch condition is not satisfied, the channel selection module 710 continues to keep monitoring the channels at block 825.

The process 800 is performed for each of the sub-bands of the frequency band to determine the suitable primary and second channels for a given sub-band.

Figure 9:
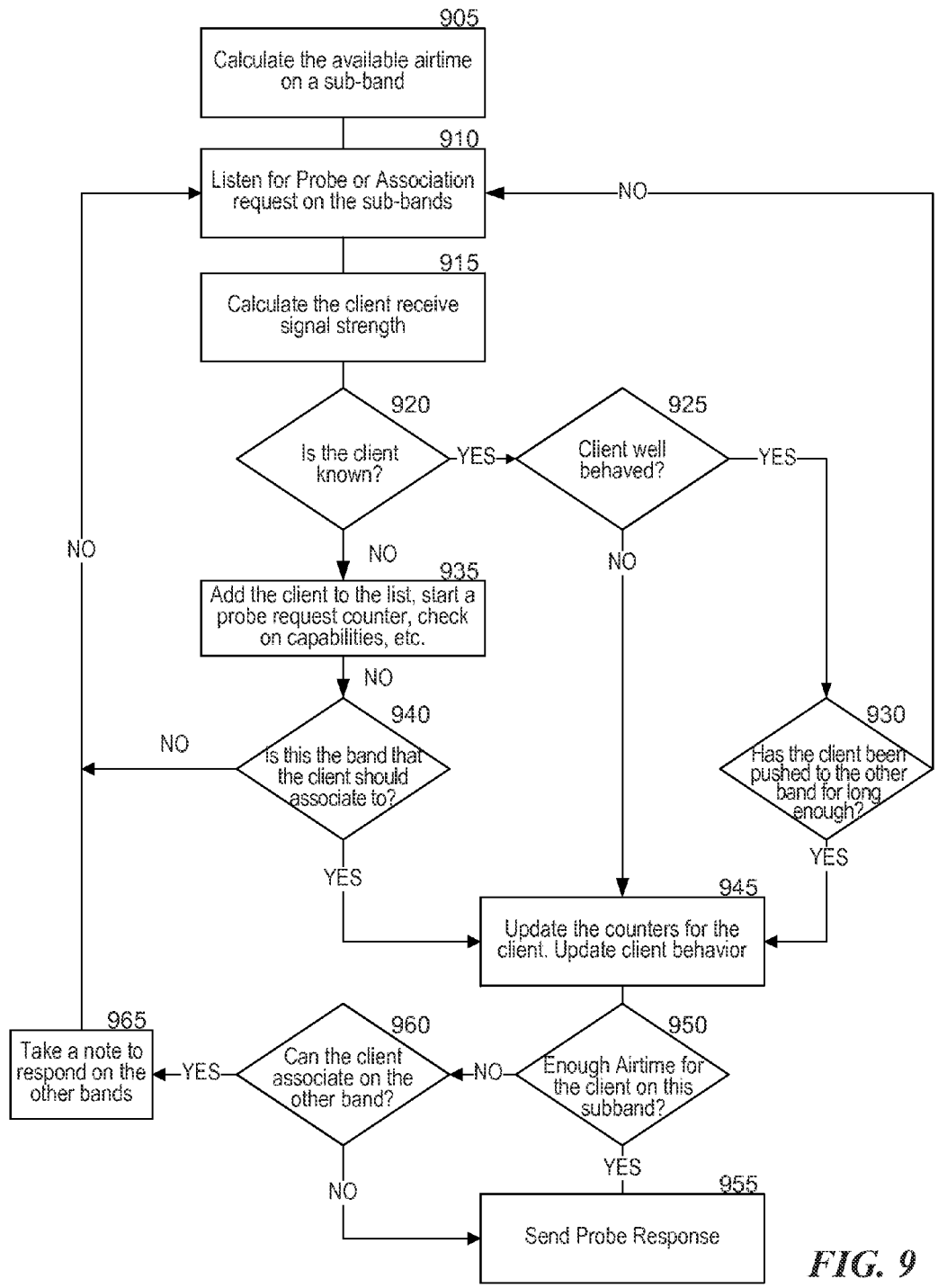
FIG. 9 is a flow diagram illustrating a process for assigning a client station to a sub-band of a frequency band, consistent with various embodiments.

FIG. 9 is a flow diagram illustrating a process 900 for assigning a client station to a sub-band of a frequency band, consistent with various embodiments. The process 900 may be executed in the environment 100 of FIG. 1 and using the wireless station 105. At block 905, the load balancing module 315 of the wireless station 105 determines an available airtime of a particular sub-band of a frequency band. For example, the frequency band can be 5 GHz band and the sub-band can be a low 5 GHz sub-band. In some embodiments, airtime is the time or any part thereof that a radio is under use by a client station. In some embodiments, the higher the load on the wireless station 105, the lower the available airtime and the lower the chance that the wireless station 105 is available for serving a new request from a client station. In some embodiments, the load balancing module 315 calculates the available airtime on a continuous basis.

At block 910, the load balancing module 315 receives a probe request from a client station on the particular sub-band. In some embodiments, the probe request is for connecting with wireless station 105.

At block 915, the load balancing module 315 calculates the RSSI of the signal received from the client station.

At determination block 920, the load balancing module 315 determines if the client station is known to the wireless station. In some embodiments, the client station is known to the wireless station 105 if the client station has previously connected with the wireless station. The wireless station 105 maintains a list of client stations that are connected and/or have connected to it in the past.

The wireless station 105 generates a profile for each of the client station that connects with the wireless station 105. The profile includes various information regarding a client station, some of which is extracted from the data packets received from the client station and some of which is determined by the wireless station 105. For example, the wireless station 105 obtains information such as MAC address, client capabilities such as hardware configuration of the client station, application type that is requesting the airtime on the wireless station 105 from the data packets transmitted by the client station. Information such as the data traffic pattern of the client station, e.g., type of traffic—video, audio, etc., times at which the data is consumed, etc. is determined by the wireless station 105.

Referring back to determination block 920, if the client station is not known to the wireless station, at block 935, the load balancing module 315 adds the client station to list of known client stations. Further, the load balancing module 315 sets up a probe request counter for the client station and sets the value of the counter to "1" indicating that the wireless station 105 has received one probe request from the client station. Furthermore, the load balancing module 315 also determines the capabilities of the client station, assignment attributes 310, etc.

At determination block 940, the load balancing module 315 determines based on the assignment attributes 310, whether the particular sub-band is the sub-band to which the client station has to be assigned. If the load balancing module 315 determines that the particular sub-band is not the sub-band to which the client station has to be assigned, the control is transferred to block 910. On the other hand, if the load balancing module 315 determines that the particular sub-band is the sub-band to which the client station has to be assigned, at block 945, the load balancing module 315 updates the probe request counter for the client station for the particular band and updates the client behavior, e.g., to either sticky or not sticky.

At block 950, the load balancing module 315 determines if there is enough available airtime for the client station on this particular sub-band. In some embodiments, the load balancing module 315 may analyze the data traffic pattern of the client station from the profile history of the client station to determine the expected amount of the airtime the client station may require. In some embodiments, the load balancing module 315 may also identify the application type on the client station that is requesting the airtime to determine the expected amount of the airtime the client station may require. Based on the expected amount of airtime required and the available airtime determined at block 905, the load balancing module 315 determines if there is enough airtime available for the client station.

If there is enough airtime available for the client station, at block 955, the wireless station 105 sends a response to the probe request to the client station on the particular sub-band. On the other hand, if there is no enough airtime available for the client station, at block 960, the load balancing module 315 determines if there is another sub-band to which the client station can be reassigned. If there is another sub-band to which the client station can be assigned, at block 965, the load balancing module 315 determines that the wireless station 105 has to respond from another sub-band and the control transfers to block 910, where the wireless station 105 can eventually receive a probe request from the client station on the other sub-band and respond from the other sub-band. If there is no other band to which the client station can associate with, at block 955, the wireless station 105 sends a response to the probe request to the client station on the particular sub-band.

Referring back to determination block 920, if the client station is known to the wireless station 105, at block 925, the load balancing module 315 determines if the client station is a well-behaved client. If the client station is not a well-behaved client, that is, the client station is a sticky client, the control transfers to block 945 where the client behavior is updated as sticky and the process proceeds. On the other hand, if the client station is a well-behaved client, at block 930, the load balancing module 315 determines if the client station has been pushed to other sub-band for long enough, e.g., a specified period. If the client station has been pushed to other sub-band for long enough, the control transfers to block 945, where the counter is incremented and the client behavior can be updated to "sticky" and the process 900 proceeds further. On the other hand, if the client station has not been pushed to other sub-band for long enough, the control transfers to block 910.

In some embodiments, the process 900 may be executed at each of the sub-bands of the frequency band.

Figure 10:
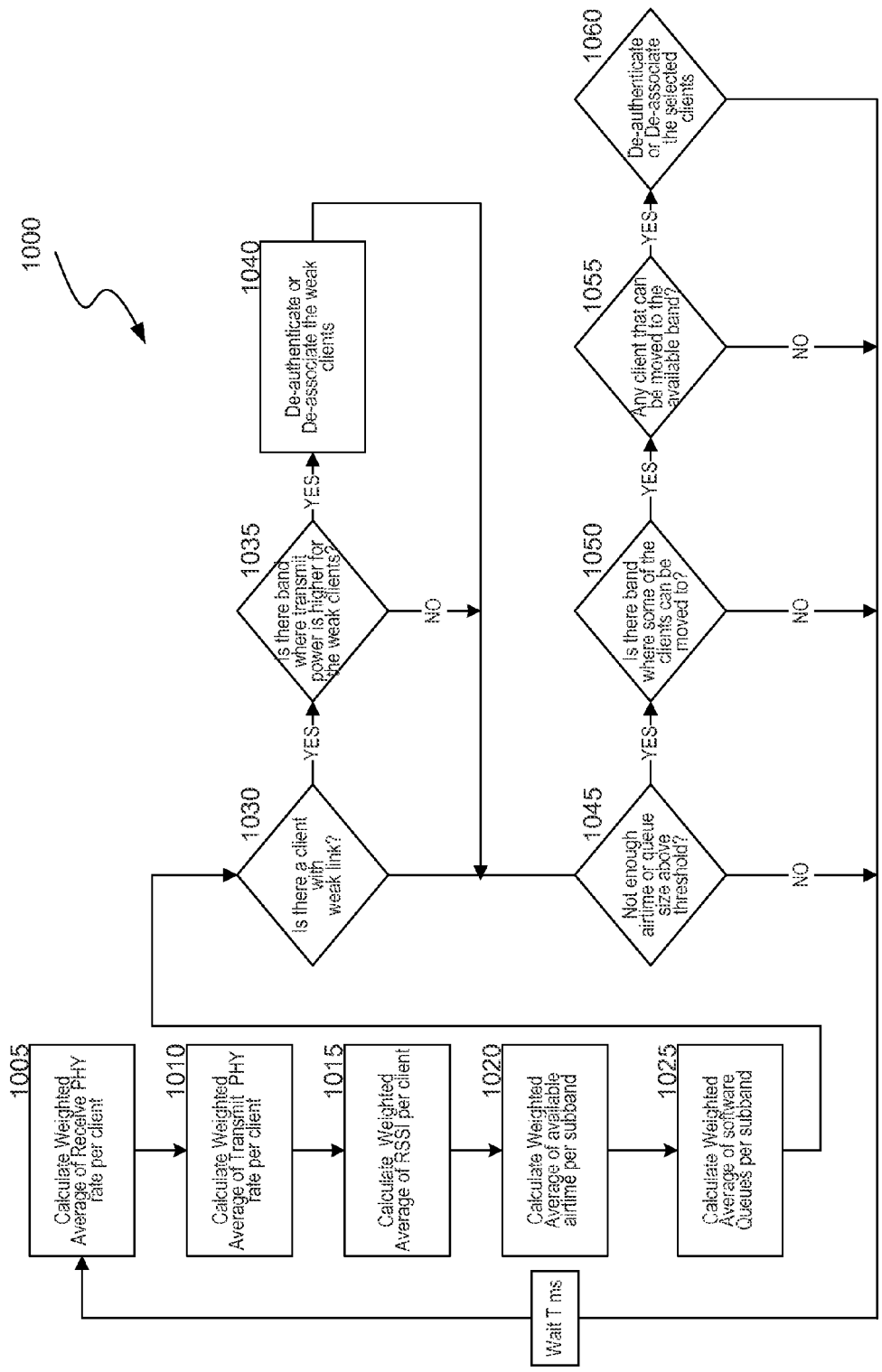
FIG. 10 is a flow diagram of a process for moving a client station from one sub-band to another sub-band of a frequency band, consistent with various embodiments.

FIG. 10 is a flow diagram of a process 1000 for moving a client station from one sub-band to another sub-band of a frequency band, consistent with various embodiments. The process 1000 may be executed in the environment 100 of FIG. 1 and using the wireless station 105. At block 1005, the load balancing module 315 of the wireless station 105 determines the weighted average receive physical layer rate per client station for all the client stations connected with wireless station 105 at the available sub-bands/bands. At block 1010, the load balancing module 315 determines the weighted average transmit physical layer rate per client station. At block 1015, the load balancing module 315 determines the weighted average of RSSI per client station. At block 1020, the load balancing module 315 determines the available airtime at each of the sub-bands. At block 1025, the load balancing module 315 determines the weighted average of the software queues for each of the sub-bands.

At determination block 1030, the load balancing module 315 determines if there is any client station with a link whose quality is below a specified threshold. If there is no client station whose link quality is below the specified threshold, at block 1045, the load balancing module 315 determines if there is any sub-band without enough airtime or if there is a queue whose size is above a specified threshold. If there is enough airtime and there is no software queue whose size is above the specified threshold, the load balancing module 315 proceeds to determine the above values again after a specified duration by proceeding to the beginning of the process 1000 at block 1005. If there is not enough airtime or if there is a software queue whose size is above the specified threshold, at determination block 1050, the load balancing module 315 determines if there is any sub-band where some of the client stations can be moved to.

If there is no sub-band where the client stations can be moved to, the load balancing module 315 proceeds to the beginning of the process 1000 at block 1005. If there is a sub-band available where the client stations can be moved to, at block 1055, the load balancing module 315 determines if there are any client stations that can be moved to the available sub-band. In some embodiments, some of the client stations cannot be moved to other sub-bands, e.g., devices in which real time applications such as audio/video calls are in progress, devices that are not stationary, e.g., smartphones which keep changing their locations relative to the wireless station 105. In some embodiments, some of the client stations can be moved to other sub-bands, e.g., devices like desktops which are stationary relative to the wireless station 105, devices like Apple TV which are stationary and whose pattern of data traffic is well known and typically will be the same over a period.

If there are no client stations that can be moved to the available band/sub-band, the load balancing module 315 proceeds to the beginning of the process 1000 at block 1005. If there are client stations that can be moved to the available band/sub-band, at block 1060, the load balancing module 315 proceeds to disassociate or de-authenticate or de-assign the selected clients from their current sub-band/band, and the process proceeds to the beginning of the process 1000 at block 1005.

Referring back to determination block 1030, if there is a client station whose link quality is below the specified threshold, at block 1035, the load balancing module 315 determines if there is a band/sub-band where the transmit power is higher for the weak clients. If there is no band/sub-band where the transmit power is higher for the weak clients, the load balancing module 315 proceeds to block 1045. If there is a band/sub-band where the transmit power is higher for the weak clients, the load balancing module 315 disassociates or de-authenticates or de-assigns the weak clients from their current sub-band/band, and the load balancing module 315 proceeds to the block 1045.

Figure 11:
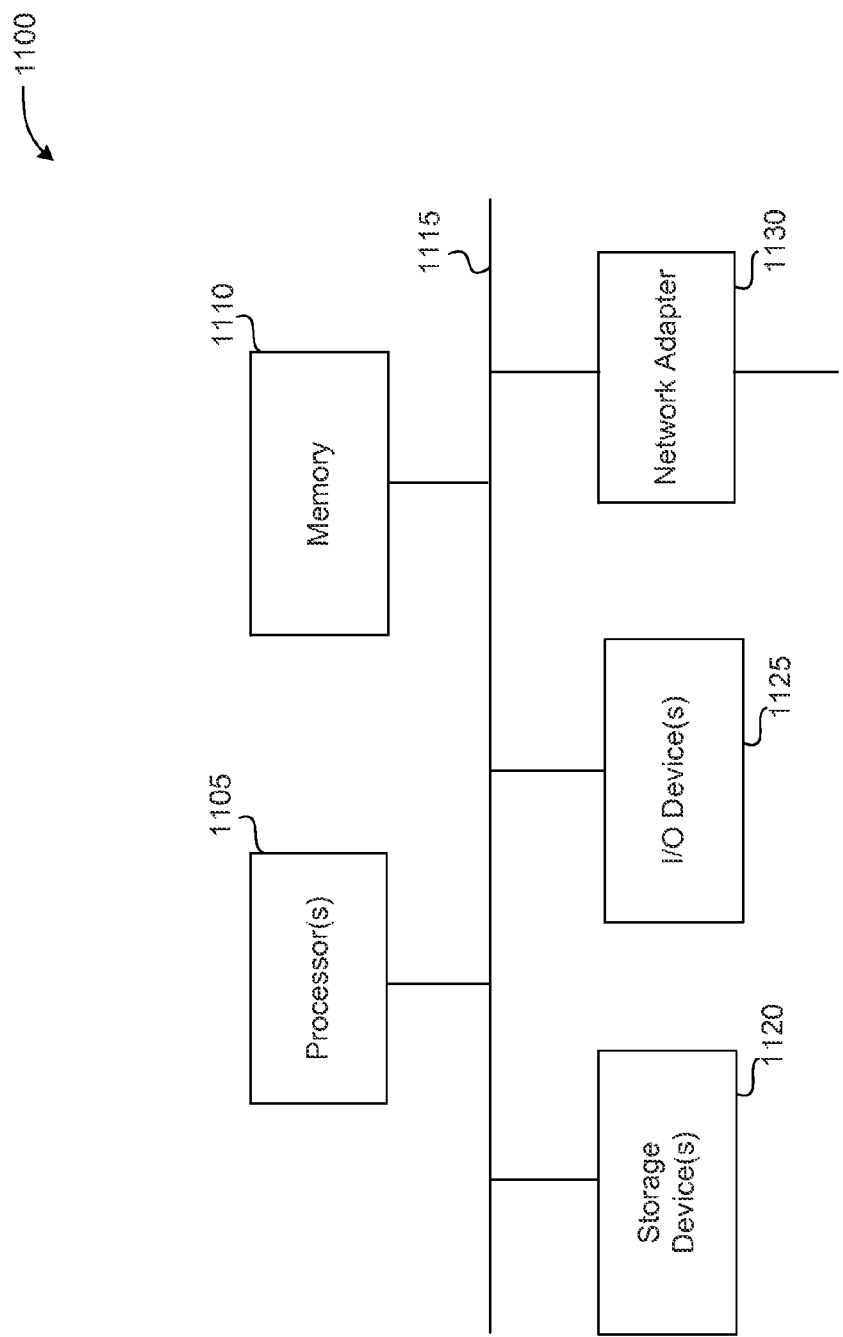
FIG. 11 is a block diagram of a computer system as may be used to implement features of some embodiments of the disclosed technology.

FIG. 11 is a block diagram of a computer system as may be used to implement features of some embodiments of the disclosed technology. The computing system 1100 may be used to implement any of the entities, components or services depicted in the examples of FIGS. 1-10 (and any other components described in this specification). The computing system 1100 may include one or more central processing units ("processors") 1105, memory 1110, input/output devices 1125 (e.g., keyboard and pointing devices, display devices), storage devices 1120 (e.g., disk drives), and network adapters 1130 (e.g., network interfaces) that are connected to an interconnect 1115. The interconnect 1115 is illustrated as an abstraction that represents any one or more separate physical buses, point to point connections, or both connected by appropriate bridges, adapters, or controllers. The interconnect 1115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1110 and storage devices 1120 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 1110 can be implemented as software and/or firmware to program the processor(s) 1105 to carry out actions described above. In some embodiments, such software or firmware may be initially provided to the processing system 1100 by downloading it from a remote system through the computing system 1100 (e.g., via network adapter 1130).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

We claim:

1. A method comprising:
 receiving, at a wireless station, a connection request from a first client station to connect to the wireless station, the wireless station operating in a multi-band frequency, the multi-band frequency including a first frequency band which is split into a first sub-band and a second sub-band, the first sub-band and the second sub-band being distinct frequency ranges within the first frequency band, the first client station communicating in the first frequency band;
 determining, by the wireless station, whether to assign the first client station to the first sub-band or the second sub-band based on an assignment criteria, the assignment criteria being a function of a first attribute associated with the first sub-band, or the second sub-band, and a second attribute associated with the first client station; and assigning, by the wireless station, the first client station to the first sub-band or the second sub-band based on the assignment criteria, wherein assigning includes:

assigning the first client station from the first sub-band to the second sub-band within the first frequency band if an available airtime at the first sub-band is below a specified threshold.

2. The method of claim 1, wherein the first frequency band is a 5 GHz band, and wherein the first sub-band is at a lower frequency range of the of the 5 GHz band and the second sub-band is at a higher frequency range of the 5 GHz band.

3. The method of claim 1, wherein assigning the first client station to the first sub-band or the second sub-band based on the assignment criteria includes:

confirming, by the wireless station, that a distance of the first client station from the wireless station is greater than a threshold, and assigning the first client station to one of the first sub-band and the second sub-band that is at a higher frequency range of the first frequency band.

4. The method of claim 3, wherein the distance is measured as a function of received signal strength indication (RSSI) of a wireless signal received from the client station.

5. The method of claim 3, wherein the distance is measured as a function of a data rate of the first client station, the data rate being a rate at which the data packet is received at the wireless station from the first client station.

6. The method of claim 1, wherein assigning the first client station to the first sub-band or the second sub-band based on the assignment criteria includes:

assigning the first client station to the first sub-band if a data rate of the first client station is in a first range, wherein the first sub-band is assigned to a first plurality of client stations whose data rates are in the first range, and assigning the first client station to the second sub-band if the data rate is in the second range, wherein the second sub-band is assigned to a second plurality of client stations whose data rates are in the second range.

7. The method of claim 1, wherein assigning the first client station to the first sub-band or the second sub-band based on the assignment criteria includes:

assigning, by the wireless station, the first client station to the first sub-band if an application executing on the first client station, which is requesting access to the wireless station, is of a first type, the first type including applications whose maximum acceptable delay in receiving or transmitting data is below a specified threshold, wherein a first plurality of applications of the first type are assigned to the first sub-band, and assigning, by the wireless station, the first client station to the second sub-band if the application is of a second type, the second type including applications whose maximum acceptable delay in receiving or transmitting data exceeds the specified threshold, wherein a second plurality of applications of the second type are assigned to the second sub-band.

8. The method of claim 7, wherein the application of the first type includes a real time or a near-real time application.

9. The method of claim 1, wherein assigning the first client station to the first sub-band or the second sub-band based on the assignment criteria includes:

assigning the first client station to the first-sub band if the first client station is of a first type, the first type including a first plurality of client stations that have a hardware configuration and communicate using protocols that support higher data rates than that of a second client station of a second type, and assigning the first client station to the second-sub band if the first client station is of the second type.

10. The method of claim 1, wherein assigning the first client station to the first sub-band or the second sub-band based on the assignment criteria includes:

determining a first load on the first sub-band as a function of available airtime on the first sub-band and a second load on the second sub-band as a function of available airtime on the second sub-band, and assigning, by the wireless station, the first client station to the first sub-band or the second sub-band as a function of the first load and the second load.

11. The method of claim 1, wherein assigning the first client station to the first sub-band or the second sub-band based on the assignment criteria includes:

confirming, by the wireless station, if the first client station is a first wireless station to which a plurality of client stations connect, and assigning, by the wireless station, the first client station to one of the first sub-band or the second sub-band exclusively.

12. The method of claim 1 further comprising:

determining, by the wireless station, an interference in the first frequency band caused by one of the first sub-band and the second sub-band on another of the first sub-band and the second sub-band; and reducing, by the wireless station, the interference by adjusting a transmission power of any of the first sub-band or the second sub-band.

13. The method of claim 1, wherein assigning the first client station to the first sub-band or the second sub-band based on the assignment criteria includes assigning the first client station to the first sub-band or the second sub-band as a function of at least one of a RSSI of a wireless signal from the wireless station and information included in the connection request.

14. The method of claim 13, wherein assigning the first client station to the first sub-band or the second sub-band includes assigning, in an event the RSSI is below a specified threshold, the first client station to one of the first sub-band and the second sub-band that is at a higher frequency range of the first frequency band.

15. The method of claim 13, wherein the information included in the connection request includes at least one of a number of antennas the first client has, a wireless protocol in which the first client station can communicate.

16. The method of claim 1, wherein the first attribute associated with the first sub-band or the second sub-band includes any of an available airtime, an interference, a transmission power, a link rate, or a data rate associated with the corresponding sub-band.

17. The method of claim 1, wherein the second attribute associated with the first client station includes any of a type, a hardware configuration, an application executing on the first client station, or a distance of the first client station from the wireless station.

18. A multi-band wireless station, comprising:

a plurality of wireless radios operating a plurality of frequency bands, wherein at least a first wireless radio and a second wireless radio operate at a first frequency band of the frequency bands, the first wireless radio operating at a first sub-band of the first frequency band, the second wireless radio operating at a second sub-band of the first frequency band, the first sub-band and the second sub-band being distinct frequency ranges within the first frequency band; and a client station assignment module to assign a plurality of client stations requesting connection to the multi-band wireless station to the first frequency band, the client station assignment module to assign a first subset of the client stations to the first sub-band and a second subset of the client stations to the second sub-band based on an assignment criteria, wherein the client station assignment module is further configured to assign a first client station from the first sub-band to the second sub-band within the first frequency band if an available airtime at the first sub-band is below a specified threshold.

19. The multi-band wireless station of claim 18, wherein the client station module is configured to assign the first subset of the client stations to the first sub-band and the second subset of the client stations to the second sub-band based on an assignment criteria by:

determining, a data rate of each of the client stations, identifying the first subset of the client stations having the data rates in a first range and the second subset of the clients having the data rates in a second range, the second range having higher data rates than the first range, and assigning the first subset of the client stations to one of the first sub-band and the second sub-band and the second subset of the client stations to another one of the first sub-band and the second sub-band.

20. The multi-band wireless station of claim 19, wherein the first sub-band is at a lower frequency range of the first frequency band and the second sub-band is a higher frequency range of the first frequency band, and wherein the second subset of the client stations is assigned to the first sub-band and the first subset of the client stations is assigned to the second sub-band.

21. The multi-band wireless station of claim 18, wherein the client station assignment module is further configured to:

determine, based on the assignment criteria, that a first client station of the first subset of the client stations has to be assigned to the second sub-band, confirm, based on a profile of the first client station, that the first client station is not sticky, and assign the first client station from the first sub-band to the second sub-band.

22. The multi-band wireless station of claim 21, wherein the client station assignment module determines that the first client station has to be assigned to the second sub-band from the first sub-band due to a change in RSSI of a signal received from the first client station.

23. The multi-band wireless station of claim 21, wherein the client station assignment module determines that the first client station has to be assigned to the second sub-band due from the first sub-band to a change in a type of an application executing at the first client station that is requesting airtime of the multi-band wireless station.

24. The multi-band wireless station of claim 21, wherein the client station assignment module determines that the first client station is sticky by:

determining that the first client station is repeatedly sending the connection request to the multi-band wireless station in the first sub-band in response to a lack of response from the multi-band wireless station to the connection request, confirming that a number of times the connect request is received exceeds a specified threshold, and determining that the first client station is sticky.

25. The multi-band wireless station of claim 21 further comprising:

a channel selection module to select a primary channel and a secondary channel for each of the first sub-band and the second sub-band, the primary channel used to transmit control data portion of data packets to a client station of the client stations, the secondary channel used to transmit data portion of the data packets to the client station.

26. The multi-band wireless station of claim 25, wherein the channel selection module is configured to:

for each of the first sub-band and the second sub-band, determine a grade for each channel of a frequency range of the first frequency band assigned to a specified sub-band, the frequency range having a plurality of channels, the grade determined as a function of any of (a) an interference caused on the channel by another sub-band, (b) a noise in the channel, (c) transmission power of the channel, or (d) number of times a data packet is transmitted to a client station before an acknowledgement is received from the client station, and assign a specified channel of the channels having a highest grade as the primary channel of the specified sub-band.

27. The multi-band wireless station of claim 26, wherein the channel selection module is further configured to:

monitor the primary channel of the specified sub-band on a specified schedule, confirm that a grade of the specified channel dropped below a specified threshold, and switch the primary channel from the specified channel to a second channel of the channels, the second channel having the highest grade.

28. A computer-readable storage medium storing computer-executable instructions, comprising:

instructions for determining, at a multi-band wireless station to which a plurality of client stations have connected wirelessly, one or more of (a) a physical (PHY) link rate for each of the client stations, (b) a RSSI of each of the client, or (c) an available airtime at each of a first sub-band and a second sub-band at which the multi-band wireless station operates, the first sub-band and the second sub-band being distinct frequency ranges within a first frequency band of a plurality of frequency bands at which the multi-band wireless station operates;

instructions for confirming that the PHY link rate or the RSSI of a specified client station of the client stations assigned to the first sub-band is below a first specified threshold;

instructions for confirming that the PHY link rate or the RSSI of the specified client station exceeds the first specified threshold on the second sub-band;

instructions for confirming that the available airtime at the second sub-band exceeds a second specified threshold; and instructions for disassociating the specified client station from the first sub-band and assigning the specified client station to the second sub-band within the first frequency band.

29. The computer-readable storage medium of claim 28, wherein the first frequency band is 5 GHz band and the first sub-band and the second sub-band are distinct frequency ranges in the 5 GHz band.

* * * * *